United States Patent Office 3,467,569
Patented Sept. 16, 1969

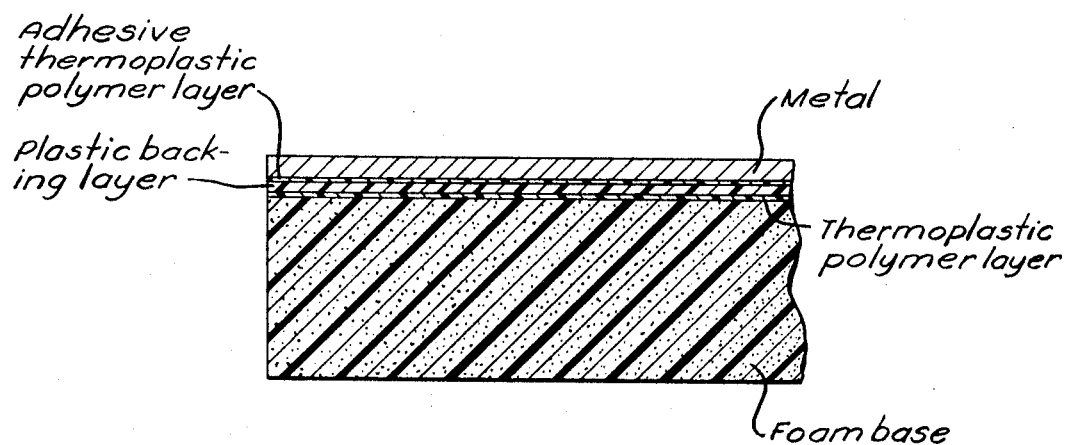

3,467,569
RESIN FOAM-METAL LAMINATE COMPOSITES
Christian A. Weber, Sanford, and Jerome L. Vincent, Auburn, Mich., assignors to The Dow Chemical Company, Midland, Mich., a corporation of Delaware
Filed June 3, 1966, Ser. No. 555,158
Int. Cl. B32b *15/04, 5/18, 15/08*
U.S. Cl. 161—160
8 Claims This invention relates to a laminated composite article. More particularly, it relates to a laminated composite article having a base of a thermoplastic synthetic resinous foam and at least one outer lamina of a thin metal sheet or foil.

Cellular thermoplastic synthetic resinous material or thermoplastic foam has found wide application in many areas including construction, packaging, insulation and other areas. Presently, sandwich-types of laminate constructions are being produced wherein a foamed resinous material is adhered between two outer layers of metal, wood or plastic. Generally, such constructions employ relatively thick outer layer materials to achieve constructions having desirable properties such as good resistance to abrasion, denting, and compressive buckling. It would be desirable to provide a laminate composite employing thinner outer layer materials to reduce the cost of construction yet retain the above-described desirable properties.

In accordance with the present invention and the drawing improved laminate composites are obtained in a construction comprising (1) a base of a synthetic resinous foamed material, (2) a layer of a solid thermoplastic backing material adhered to at least one side of the foamed base through a first intermediate layer of a resinous thermoplastic material and (3) a metal layer adhered to the backing material through a second intermediate layer of an adhesive thermoplastic material.

Various types of synthetic resinous foam materials may be used in the practice of the invention. It is preferred that the foam be of the closed-cell type and of a synthetic resinous material. The foam is generally cut to appropriate size leaving exposed at each surface thereof open portions of individual cells. Examples of foamed materials that may be used in the present invention include alkenyl aromatic polymers of normally solid homopolymer or copolymer of one or more monovinyl aromatic compounds such as styrene, vinyltoluene, vinylxylene, ethylvinylbenzene, tert-butylstyrene, isopropylstyrene, chlorostyrene, dichlorostyrene, bromostyrene, fluorostyrene, ethylvinyltoluene, or copolymers of a predominant amount of any one or more of such monovinyl aromatic compounds and a minor proportion of one or more other copolymerizable vinylidene compounds such as vinyl esters of aliphatic and aromatic acids, esters or acrylic and methacrylic acid, acrylonitrile and alphamethyl styrene, methyl isopropenyl ketone, and the like. Other types of foamed materials that may be used include copolymers of styrene and maleic anhydride, phenolic foams, polyurethane foams, and the like. When fabricating the laminates of the invention, finely divided particles of a thermoplastic material are spread over the surface of the foamed base. These particles fill open portions of the cells exposed at the surface of the foam. The particle layer may be of an adhesive thermoplastic material which is suitable for bonding the foamed base to an adjacent surface when the entire assembly is subjected to heat and pressure.

The first intermediate layer is a thermoplastic material having a melting point lower than the foam base material. The lower melting point makes possible the formation of a bond between the foam base and backing material with a minimum of densification or melting of the surface of the foam. The thermoplastic material is preferably employed in finely divided particle form, said particles having a size substantially less than the openings of the cells. Suitable thermoplastic materials include olefin polymers such as polyethylene, polypropylene, and the like. Other polymers include random, block and graft copolymers of a major proportion of ethylene and from about 3 to about 20 percent by weight based on the copolymer of an acidic comonomer selected from $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. Specific examples of such acidic comonomers are acrylic acid, methacrylic acid, crotonic acid, fumaric acid, maleic acid, itaconic acid, maleic anhydride, monomethyl maleate, monoethyl maleate, monomethyl fumarate, and monoethyl fumarate.

The backing material is adhered to the metal layer by means of an intermediate layer of an adhesive thermoplastic polymer. Such polymers include random, graft and block copolymers of a major proportion of ethylene and from about 3 to about 20 percent by weight based on the copolymer of an acidic comonomer selected from $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. Specific examples of such acidic comonomers are acrylic acid, methacrylic acid, crotonic acid, fumaric acid, maleic acid, itaconic acid, maleic anhydride, monomethyl maleate, monoethyl maleate, monomethyl fumarate, and monoethyl fumarate.

The thermoplastic backing layer is preferably adhered to both the foamed base and thin outer layer by means of a layer of the above-described copolymer. The backing provides additional strength for the thin metal employed and the resulting laminate has improved properties such as good dent resistance, resistance to metal buckling and increased flexural strength. Materials that are suitable to be employed as backing material include rigid polyvinyl chloride; polyolefins such as polyethylene and polypropylene; polymers of styrene such as copolymers of styrene and malic anhydride; terpolymers of acrylonitrile, butadiene and styrene; polyorthochlorostyrene and copolymers of ethylene and ethylenically unsaturated carboxylic acid, e.g. ethylene and acrylic acid, and the like.

The metals that may be employed in the fabrication of the laminates of the invention include aluminum, copper, steel, magnesium, lead, and the like. The thickness of the metals are from about 1 mil to about 20 mils and preferably from about 4 mils to about 12 mils.

Temperatures during the fabrication process should be such that the surface of the foam is not excessively heated to collapse the cells and form a thick, solid layer of polymer. However, a small layer of foam cells is collapsed since the temperature must be sufficient to reduce the powdered thermoplastic resin on the surface of the foam to a molten or plastic state to form the bond between the foam base and the metal layer. Suitable fabrication temperatures have been found to be from about 280° F. to about 350° F.

It is to be understood that the present invention includes a construction comprising a foam base having adhered to one or both sides thereof the multi-layered construction as previously described. It is further understood that the laminate construction of the invention may be utilized to produce flat or contoured articles.

The particular construction of the invention employs thinner metals than that currently used in similar laminate constructions. This is possible through the use of the thermoplastic backing layer which is interposed between and adhered to the foamed base and metal layer. Therefore, the particular construction provides a laminate having satisfactory tensile stress requirements during flexure loadings and, further, provides good dent resistance and resistance to metal buckling.

The laminates may be used as or in producing sidewall panels, roofing panels, flotation panels, illustration, and the like.

The laminates of the following examples are tested according to the following procedures:

Dart impact test

A dart 1½" in diameter and having a hemispherical shape on one end was suspended above the laminate. The laminate was clamped over a ring and the dart was arranged to fall through the middle of the ring. The degree of impact was determined by measuring the depth of the depression in mils in the center of the impact area, said depth being measured from the plane or original surface of the laminate. The dart was dropped from a height of 1 to 2 feet, said dart weighing about one pound.

The flexure test

This test was conducted in accordance with ASTM C-393-62 with the following modifications: The load was applied at the ¼ and ¾ points instead of at the midpoint of the span between the end support.

The flexural rigidity was obtained from the following equation:

$$Y = 11PL^3/384D_A$$

where,

Y = Deflection, inches
P = Total load, pounds
L = Span between supports, inches
$D_A$ = Apparent flexural rigidity, pounds force—in.$^2$

Peel test

The laminates are tested in accordance with ASTM method D-903-49 except that a cross-head separation speed of about 4 in./min. was employed.

The following examples are illustrative of the invention and are not intended to limit the scope thereof

Example 1

A 200 mesh powder of a random copolymer of ethylene and acrylic acid (8 percent acrylic acid) was spread uniformly over the surface of a layer of foamed polystyrene measuring 6" x 18" x 1½". The powder was spread onto the surface at a concentration of 5 gm./ft.$^2$. A sheet of high density polyethylene (melt index 0.030, density 0.956–0.959) measuring 6" x 18" x 0.015" was placed over the powdered copolymer layer A film of a copolymer of ethylene and 8 percent by weight acrylic acid measuring 6" x 18" x 0.002" was placed over the sheet of high density polyethylene and a sheet of aluminum 6" x 18" x 0.008" was placed over the copolymer film. The assembly was placed into a hydraulic press with the upper platen (in contact with the metal laminate sheet) at a temperature of about 350° F. and subjected to a pressure of 10 p.s.i. for about 20 seconds The lower platen was at room temperature. The resulting laminate was removed from the press and quickly cooled by placing it in another press at 45° F. and under a pressure of 10 p.s.i. The above procedure provides a laminate composite comprising a foam base having adhered to one side thereof the above-described multi-layer construction.

The above procedure was repeated and similar layers of the described materials were applied to the other side of the foamed core to form a laminate composite with the multi-layer construction adhered to each side of the foam base. The resulting laminate was tested in accordance with the procedures as previously described and had the following properties:

Dart impact, mills _____ 68
Flexural rigidity, pounds force—in.$^2$ _____ 220,000
Peel strength, lbs./in. width _____ 0.7

Example 2

The procedure of Example 1 was substantially repeated except that 2 mils of dead soft aluminum was substituted for the 8 mil aluminum. The resulting laminate was tested and had the following properties:

Dart impact, mils _____ 87
Flexural rigidity, pounds force—in.$^2$ _____ 120,000
Peel strength, lbs./in.width _____ 1

In place of the particular polymers, copolymers and metal employed in the construction of the laminates of the foregoing examples, other polymers, copolymers, and metals may be employed, as hereinbefore described, to obtain substantially the same results.

What is claimed is:

1. An article of manufacture which comprises a laminate having a base of a synthetic resinous foamed material and having adhered to at least one side thereof a solid thermoplastic backing material, said backing material being adhered to the foamed material through a first intermediate layer of a resinous thermoplastic material and a metal layer adhered to the backing material through a second intermediate layer of an adhesive thermoplastic material.

2. The article according to claim 1 wherein the foamed material is expanded polystyrene.

3. The article according to claim 1 wherein the solid thermoplastic backing material is polyethylene.

4. The article according to claim 1 wherein the first intermediate layer of resinous thermoplastic material is a copolymer of ethylene and an ethylenically unsaturated carboxylic acid.

5. The article according to claim 4 wherein the copolymer is a copolymer of ethylene and acrylic acid.

6. The article according to claim 1 wherein the first intermediate layer of resinous thermoplastic material is a copolymer of ethylene and acrylic acid, the second intermediate layer of adhesive thermoplastic material is a copolymer of ethylene and acrylic acid and the metal is aluminum.

7. The article according to claim 1 wherein the metal is aluminum.

8. The article according to claim 1 wherein the foamed material is expanded polystyrene, the solid thermoplastic backing material is polyethylene, the first intermediate layer of resinous thermoplastic material is a copolymer of ethylene and acrylic acid, the second intermediate layer of adhesive thermoplastic material is a copolymer of ethylene and acrylic acid and the metal is aluminum, said metal having a thickness of from about 1 to about 20 mils.

References Cited

UNITED STATES PATENTS 3,180,778   4/1965   Rinderspacher et al. __ 161—161

ROBERT F. BURNETT, Primary Examiner

WILLIAM J. VAN BALEN, Assistant Examiner

U.S. Cl. X.R.

161—165, 216, 218, 252, 254